US008879111B2

(12) United States Patent
Yamasaki

(10) Patent No.: US 8,879,111 B2
(45) Date of Patent: Nov. 4, 2014

(54) APPARATUS FOR GENERATING IMPOSITION INFORMATION AND RECORDING MEDIUM

(75) Inventor: Toshiyuki Yamasaki, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 252 days.

(21) Appl. No.: 12/858,160

(22) Filed: Aug. 17, 2010

(65) Prior Publication Data

US 2011/0077759 A1 Mar. 31, 2011

(30) Foreign Application Priority Data

Sep. 25, 2009 (JP) ................................. 2009-221558

(51) Int. Cl.
*G06K 15/00* (2006.01)
*G06F 3/12* (2006.01)

(52) U.S. Cl.
CPC ............ *G06F 3/1257* (2013.01); *G06F 3/1282* (2013.01); *G06F 3/125* (2013.01); *G06F 3/1204* (2013.01)
USPC ........ 358/1.18; 358/1.15; 358/1.16; 358/452; 715/243; 715/246

(58) Field of Classification Search
USPC ...................... 358/1.15, 1.16, 1.18, 1.13, 452; 715/243, 246, 255, 273, 274
See application file for complete search history.

(56) References Cited

U.S. PATENT DOCUMENTS

| | | | |
|---|---|---|---|
| 6,384,932 B1 * | 5/2002 | Fujisawa et al. ............. | 358/1.18 |
| 2002/0171871 A1 | 11/2002 | Catt et al. | |
| 2004/0218217 A1 | 11/2004 | Dechamps | |
| 2007/0229903 A1 * | 10/2007 | Sato ............................. | 358/1.18 |
| 2009/0195834 A1 * | 8/2009 | Toda ............................ | 358/1.18 |
| 2009/0296119 A1 * | 12/2009 | Kurihara ....................... | 358/1.9 |

FOREIGN PATENT DOCUMENTS

| | | |
|---|---|---|
| GB | 2 447 435 | 9/2008 |
| JP | 2003-58355 | 2/2003 |
| JP | 2003-348322 | 12/2003 |
| JP | 2005-275324 | 10/2005 |
| JP | 2006-268358 | 10/2006 |
| JP | 2008-37523 | 2/2008 |
| JP | 2008-271208 | 11/2008 |
| JP | 2008-276623 | 11/2008 |
| JP | 2008-302518 | 12/2008 |
| WO | WO 2007/058390 | 5/2007 |

OTHER PUBLICATIONS

European Search Report in connection with counterpart European Patent Application 10008389.8, date mailed Nov. 27, 2012.

* cited by examiner

*Primary Examiner* — Vu B Hang
(74) *Attorney, Agent, or Firm* — Ostrolenk Faber LLP

(57) ABSTRACT

In an imposition information generating apparatus (2), folding template information (31) indicating an instruction to fold a print sheet is prepared in a memory (24) in advance. When generating imposition information (32), input of selection information including a page size of a book product, a selection whether bag-like portions in a section are to be located on the top or bottom of the section, and a selection which side of the section is to be stitched, is received. Then, the imposition information (32) for printing the print sheet which is to be folded into the section is generated on the basis of the folding template information (31) and the selection information in an imposition information generator (22). As above, by preparing the folding template information (31) in advance, it is possible to generate the imposition information (32) easily.

18 Claims, 14 Drawing Sheets

APPARATUS FOR GENERATING IMPOSITION INFORMATION AND RECORDING MEDIUM

TECHNICAL FIELD

The present invention relates to a technique of generating imposition information for printing a print sheet which is to be folded into a section after printing.

BACKGROUND ART

In a book manufacturing process, a plurality of pages are conventionally imposed on each surface of one print sheet to be printed thereon. The printed sheet is folded by a folding machine to make a section and a plurality of sections are stacked. After that, they are stitched and a trimming process is performed to complete a book product such as a book.

Japanese Patent Application Laid-Open No. 2008-302518 discloses a technique which enables a user to check before execution of printing which part of printing data appears on a front surface of printed matter after execution of paper folding. In the technique, an indication of a paper folding method by the user is acquired, a preview image where a printing data image is synthesized with a template image according to the indication of the paper folding method is generated, and the preview image is displayed.

In printing for a print sheet to be folded into a section, required is imposition information indicating positions of areas on the print sheet corresponding to respective pages of a book product and orientations of the respective pages on the print sheet. The imposition information is generated in accordance with a combination of a page size of the book product, a folding method of the print sheet to make the section, a selection whether bag-like portions in the section are to be located on the top or bottom of the section (i.e., a selection of an orientation of the bag-like portions), a selection which side (left side or right side) of the section is to be stitched and the like. However, it is not easy to generate the imposition information under all the conditions.

It is thought that a plurality of sets of imposition information each corresponding to a combination of a page size of book product, a folding method of print sheet, an orientation of bag-like portions in a section, a side of the section to be stitched and the like, are generated in advance, and in operation, one set of imposition information corresponding to an actual book manufacturing process is selected from these sets of imposition information. However, since the number of these sets is large, generation and management of many sets of imposition information are complicated, and there is a possibility that a wrong selection is made when one set of imposition information corresponding to an actual book manufacturing process is selected from many sets of imposition information. In the case where only a suitable set of imposition information is generated when needed, if a condition such as a side of the section to be stitched is changed after generation of the imposition information, complicated work needs to be done again to generate new imposition information. As above, it is difficult to promptly deal with the change of condition. Thus, a new technique where imposition information can be generated easily is required.

SUMMARY OF INVENTION

The present invention is intended for an apparatus for generating imposition information for printing a print sheet which is to be folded into a section after printing. It is an object of the present invention to generate the imposition information easily.

The apparatus according to the present invention comprises: a memory which stores folding template information indicating an instruction to fold a print sheet; an input receiving part for receiving input of selection information including a page size of a book product, a selection whether bag-like portions in a section are to be located on the top or bottom of the section, and a selection which side of the section is to be bound; and an imposition information generator for generating imposition information indicating positions of areas on the print sheet corresponding to respective pages of the book product and orientations of the respective pages on the print sheet, on the basis of the folding template information and the selection information. In the present invention, since the folding template information is prepared in advance, the imposition information can be generated easily.

Preferably, the selection information includes a selection of perfect binding or saddle binding. Therefore, the imposition information can be generated in consideration of difference between perfect binding and saddle binding.

According to a preferred embodiment of the present invention, the folding template information includes a cutting position on a print sheet between printing and folding processes and an overlaying position of a plurality of sheets after cutting, or the number of print sheets to be overlaid and folded as a unit after a printing process. It is therefore possible to generate the imposition information easily in the case where the folding process is performed on the sheets overlaid as a unit.

According to another preferred embodiment of the present invention, the apparatus further comprises: a template generator for generating the folding template information on the basis of input by an operator indicating the instruction; and a display for displaying the instruction which folding template information in the course of generation indicates. In the apparatus, the folding template information can be generated easily by referring to the instruction displayed on the display.

According to still another preferred embodiment of the present invention, the apparatus further comprises: a folding information generator for generating folding information indicating, in the order of folding events, folding position coordinates and folding directions on an object in a folding process on the basis of the folding template information and the selection information. As the result, setting of an external folding machine for the folding process can be performed easily.

The present invention is also intended for a computer-readable recording medium carrying a program for causing a computer to generate imposition information for printing a print sheet which is to be folded into a section after printing.

These and other objects, features, aspects and advantages of the present invention will become more apparent from the following detailed description of the present invention when taken in conjunction with the accompanying drawings.

DESCRIPTION OF EMBODIMENTS

Figure 1:
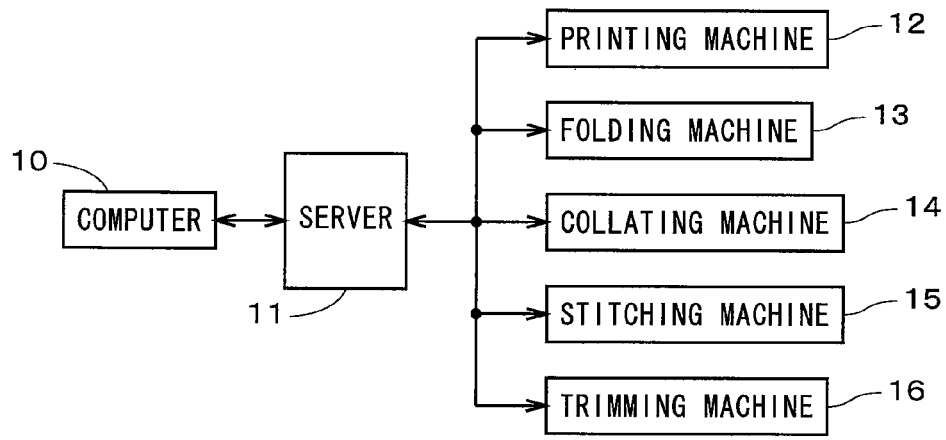
FIG. 1 is a block diagram showing a constitution of a book manufacturing system.

FIG. 1 is a block diagram showing a constitution of a book manufacturing system 1 for manufacturing a book product such as a book. The book manufacturing system 1 in FIG. 1 comprises a printing machine 12 for printing a print sheet such as a print paper, a folding machine 13 for making a section (it is also called a fold section or signature) by performing a folding process on the print sheet after printing, a collating machine 14 for stacking a plurality of sections in a predetermined order, a stitching machine 15 for stitching (binding) the plurality of sections, a trimming machine 16 for performing three-side trimming (cutting) on the stitched sections, and a server 11 connected to the printing machine 12, the folding machine 13, the collating machine 14, the stitching machine 15 and the trimming machine 16. To the server 11, a computer 10 is connected.

Figure 2:
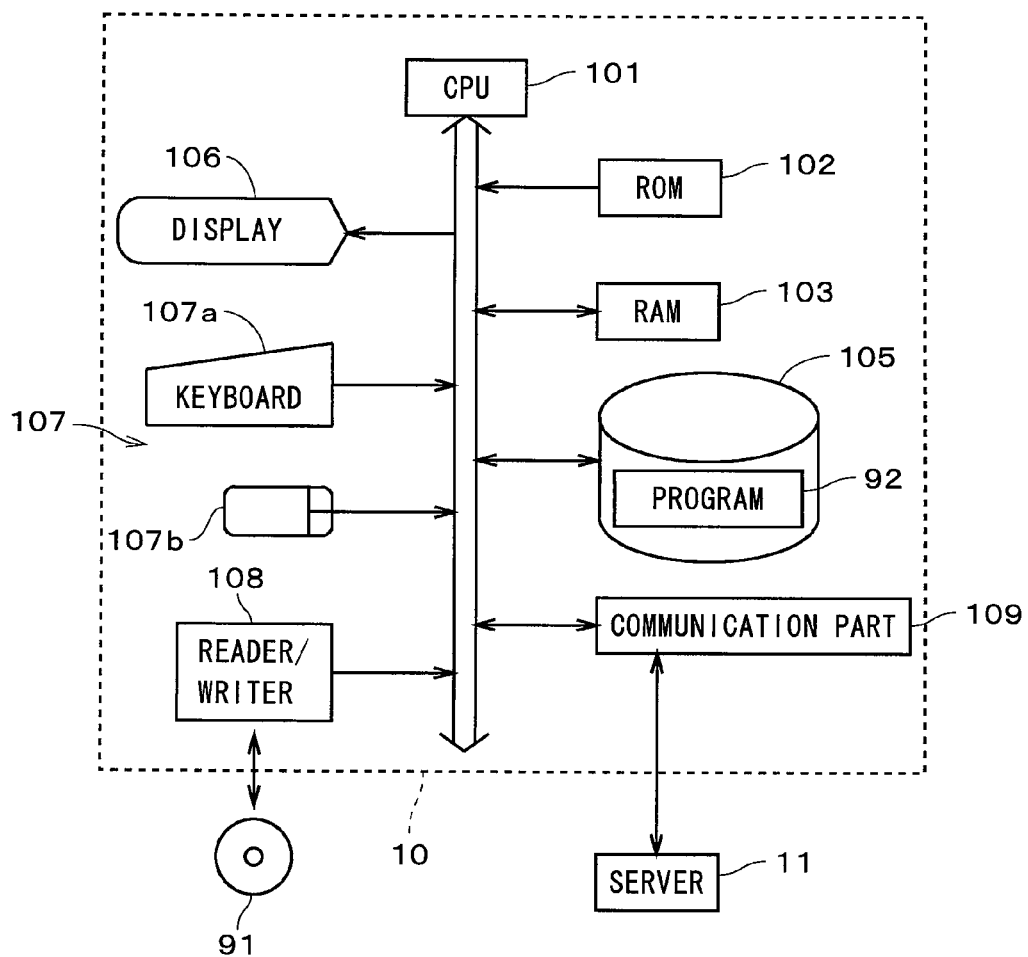
FIG. 2 is a view showing a structure of a computer.

FIG. 2 is a view showing a structure of the computer 10. As shown in FIG. 2, the computer 10 has a structure of general computer system where a CPU 101 for performing various computations, a ROM 102 for storing a basic program and a RAM 103 for storing various information are connected to a bus line. To the bus line, a fixed disk 105 for storing information, a display 106 for displaying various information, a keyboard 107*a* and a mouse 107*b* (hereinafter, generically referred to as an "input part 107") for receiving input from an operator, a reader/writer 108 which reads information from a computer-readable recording medium 91 such as an optical disk, a magnetic disk or a magneto-optic disk and writes information into the recording medium 91, and a communication part 109 for making communications with the server 11 are further connected through interfaces (I/F) as appropriate.

In the computer 10, a program 92 is read out from the recording medium 91 through the reader/writer 108 in advance and stored in the fixed disk 105. The program 92 is copied in the RAM 103, the CPU 101 performs a computation according to the program in the RAM 103 (that is, the computer executes the program), and the computer 10 operates as an imposition information generating apparatus for generating after-mentioned imposition information (i.e., allocation information or pagination information) used in the printing machine 12.

Figure 3:
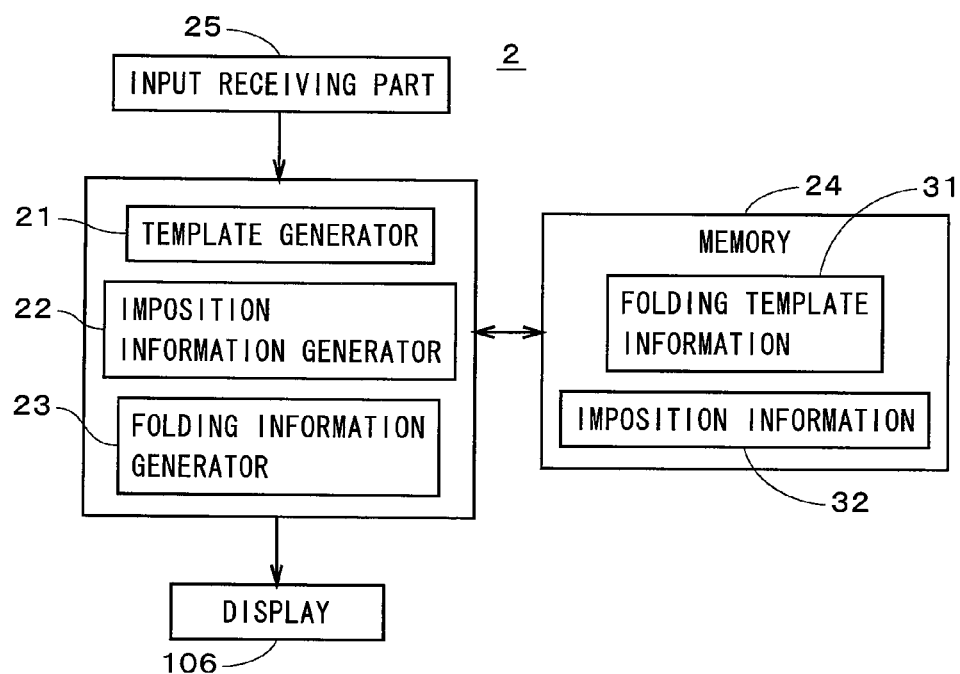
FIG. 3 is a block diagram showing a functional constitution implemented by the computer.

FIG. 3 is a block diagram showing a functional constitution implemented by the computer 10. A template generator 21 in FIG. 3 generates folding template information 31 indicating an instruction to fold a print sheet, an imposition information generator 22 generates imposition information 32 (see after-mentioned FIG. 13) indicating positions of areas on the print sheet corresponding to respective pages of a book product and orientations of the respective pages on the print sheet, and a folding information generator 23 generates information used for the folding process in the folding machine 13 and a trimming process in the trimming machine 16. A memory 24 stores the folding template information 31 and the imposition information 32. An input receiving part 25 receives various input entered through the input part 107 or the communication part 109, and various information is displayed on a display 106 by display control in the template generator 21 and so on. In the book manufacturing system 1, these functions which are regarded as the imposition information generating apparatus 2 are implemented by the computer 10. The functions of the template generator 21, the imposition information generator 22, the folding information generator 23 and the input receiving part 25 may be constructed as a dedicated electric circuit or a dedicated electric circuit may be partially used.

Figure 4:
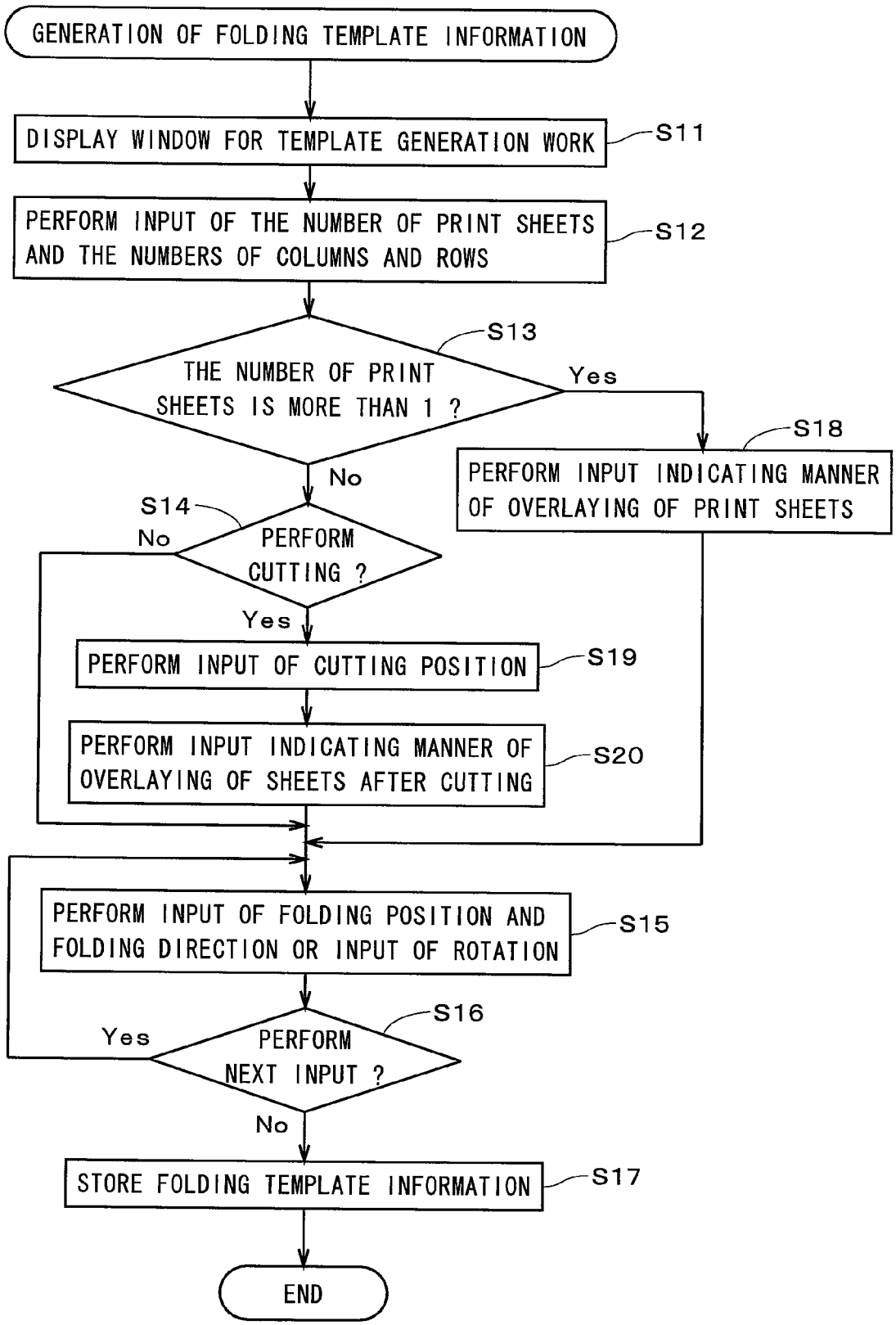
FIG. 4 is a flowchart showing an operation flow for generating folding template information.

FIG. 4 is a flowchart showing an operation flow for generating the folding template information 31. The process of generating the folding template information in FIG. 4 is performed as advance preparation of an after-mentioned process of generating the imposition information 32.

Figure 5:
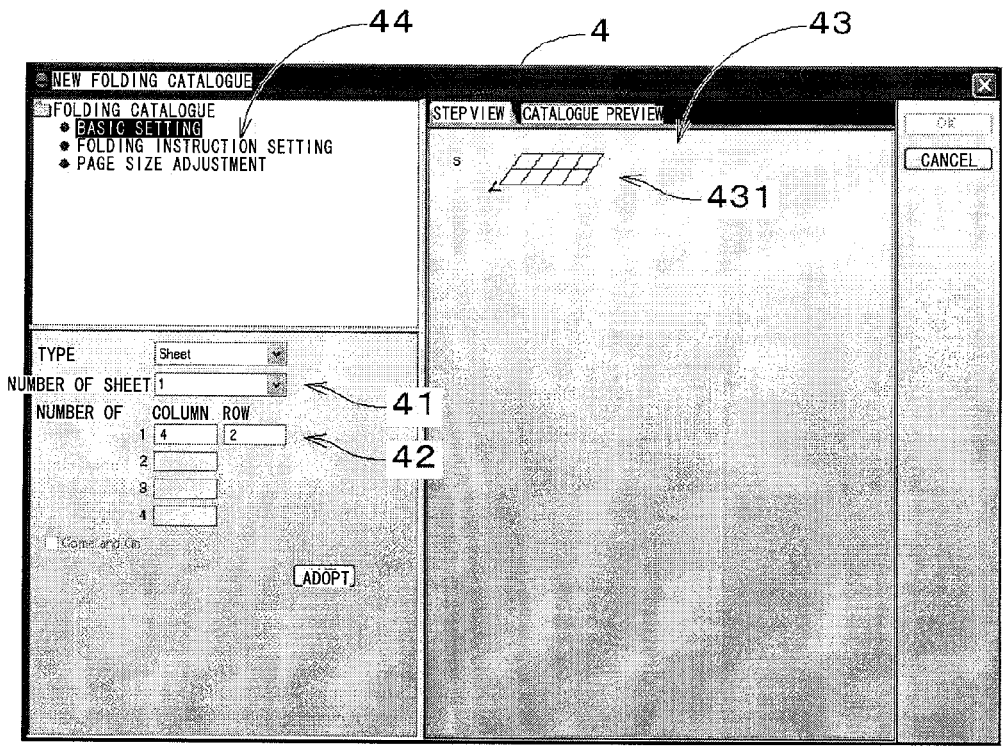
FIGS. 5 to 11 are views each showing a window displayed in generation of the folding template information.

In generation of the folding template information 31, after the program 92 is launched, input indicating generation of the folding template information 31 is performed through the input part 107 by the operator, to display a window 4 for template generation work shown in FIG. 5 on the display 106 (Step S11). Subsequently, in a setting part 41 of the number of sheets and a setting part 42 of the numbers of columns and rows placed at the lower left portion of the window 4 in FIG. 5, desired input is performed by the operator and the input is received by the input receiving part 25 (Step S12). For example, when "1" is inputted to the setting part 41 of the number of sheets and "4 columns and 2 rows" is inputted to the setting part 42 of the numbers of columns and rows, an image 431 showing a print sheet is displayed by the template generator 21, on an instruction displaying part 43 at the right portion of the window 4. In the image 431, dividing lines which equally divide one print sheet into 4 columns and 2 rows are shown. The number of print sheets in the setting part 41 indicates the number of print sheets for which a one-time folding process by the folding machine 13 is intended.

Figure 6:
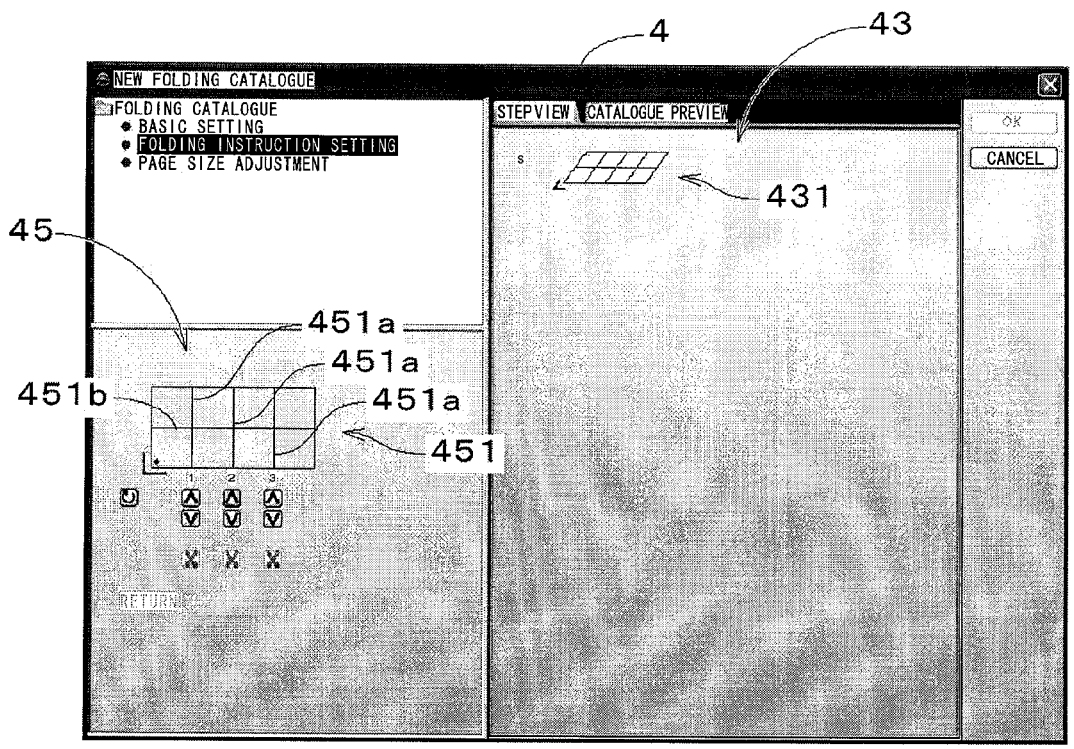

In the present example, since the folding process by the folding machine 13 is intended for one print sheet (Step S13) and cutting of print sheet is not performed between the printing process and the folding process (Step S14). Thus, after the number of print sheets and the numbers of columns and rows are set, "folding instruction setting" is selected by the operator in a setting work changing part 44 at the upper left portion of the window 4. Therefore, as shown in FIG. 6, an instruction setting part 45 is displayed at the lower left portion of the window 4 as substitute for the setting part 41 of the number of sheets and the setting part 42 of the numbers of columns and rows. The case where the folding process is intended for a plurality of print sheets and the case where cutting of print sheet is performed will be discussed later.

In the instruction setting part 45, an image 451 showing a print sheet is displayed, and three vertical dividing lines 451*a* which equally divide the print sheet into 4 columns and one horizontal dividing line 451*b* which equally divides the print sheet into 2 rows are shown in the image 451 in a similar fashion to the image 431 in the instruction displaying part 43. Subsequently, input indicating folding positions and folding directions (i.e., mountain fold or valley fold) at respective folding positions is performed in the instruction setting part 45 (Step S15). Specifically, the central vertical dividing line 451*a* of three vertical dividing lines 451*a* is selected as a folding position and a valley fold is selected as a folding direction. Therefore, as shown in the instruction displaying part 43 of FIG. 7, displayed is an image 432 showing the print sheet in the state where the print sheet shown in the image 431 is valley folded at the central vertical dividing line 451a (see the instruction setting part 45 in FIG. 6).

Figure 7:
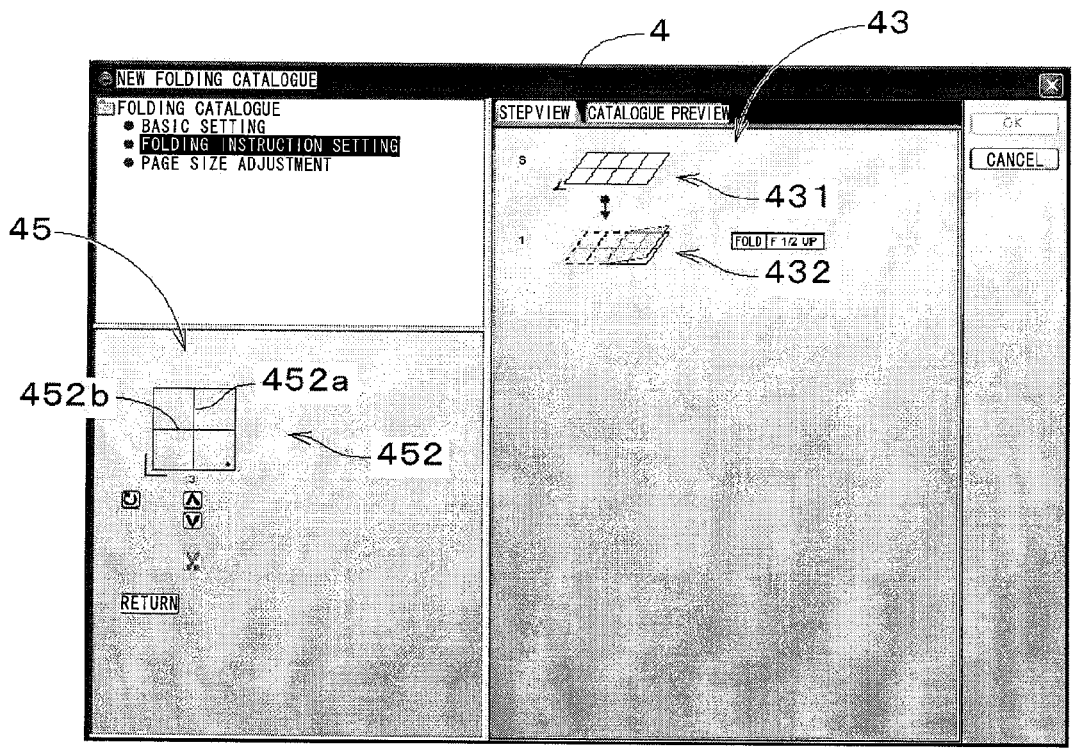

In the instruction setting part 45 of FIG. 7, an image 452 showing the print sheet in the state corresponding to the latest image 432 in the instruction displaying part 43 is displayed (the same applies to the instruction setting part 45 in after-mentioned FIGS. 8 to 11). In this example, since the print sheet is in the state where it is folded in half, one vertical dividing line 452a which equally divides the print sheet into 2 columns and one horizontal dividing line 452b which equally divides the print sheet into 2 rows are shown.

Figure 8:
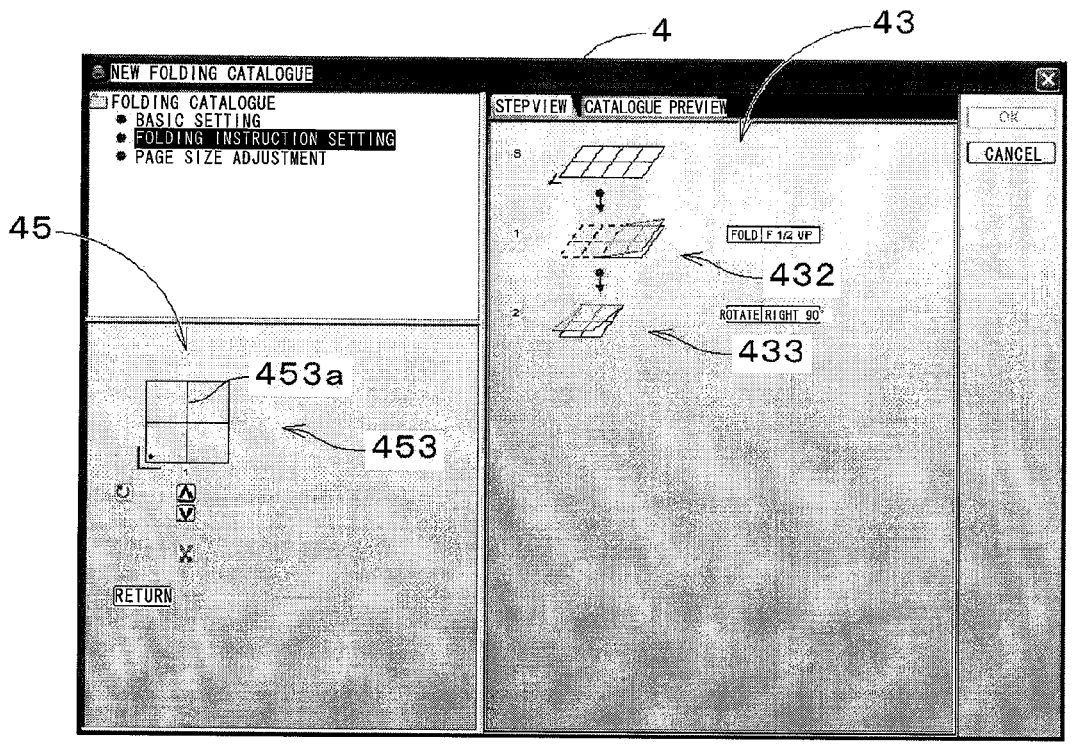
Figure 9:
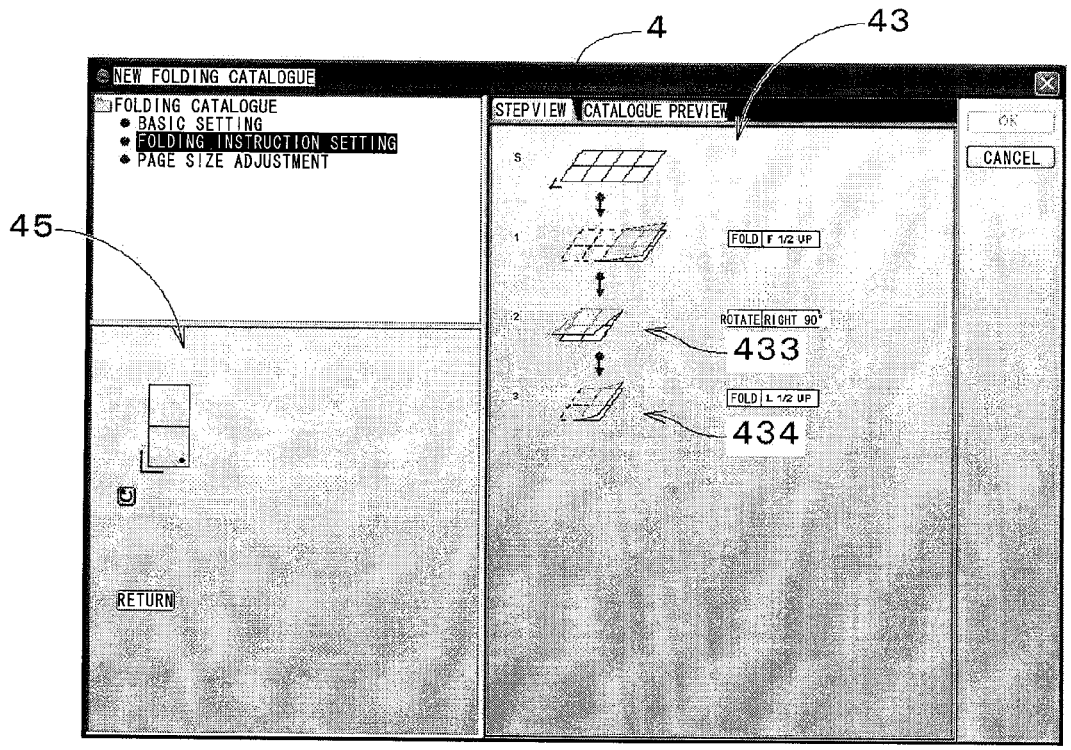

Subsequently, input indicating that the print sheet is rotated clockwise by 90 degrees around an axis perpendicular to a main surface (i.e., the axis is orthogonal to the dividing lines 452a, 452b) is performed in the instruction setting part 45. As shown in FIG. 8, an image 433 showing the print sheet in the state where the print sheet shown in the image 432 is rotated clockwise by 90 degrees is displayed on the instruction displaying part 43 (Steps S15, S16). After that, in the instruction setting part 45 of FIG. 8, the vertical dividing line 453a in an image 453 showing the rotated print sheet is selected as a folding position and a valley fold is selected as a folding direction. Therefore, as shown in the instruction displaying part 43 of FIG. 9, an image 434 showing the print sheet in the state where the print sheet shown in the image 433 is valley folded at the vertical dividing line 453a (see the instruction setting part 45 in FIG. 8) is displayed (Steps S16, S15).

Figure 10:
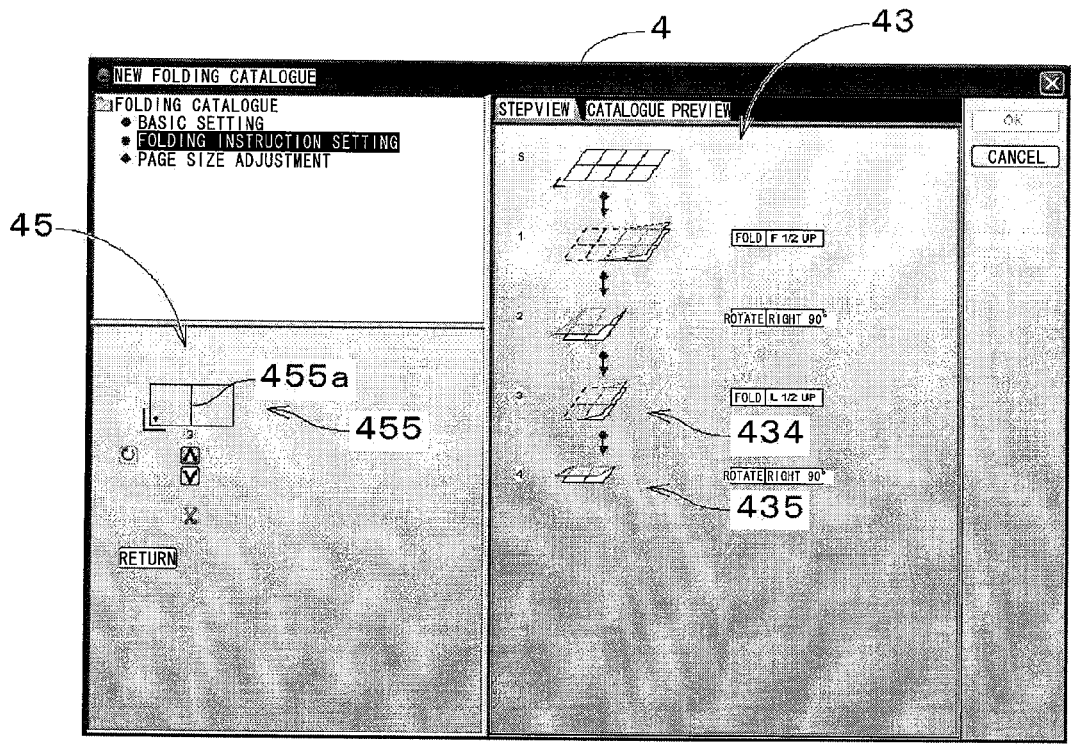
Figure 11:
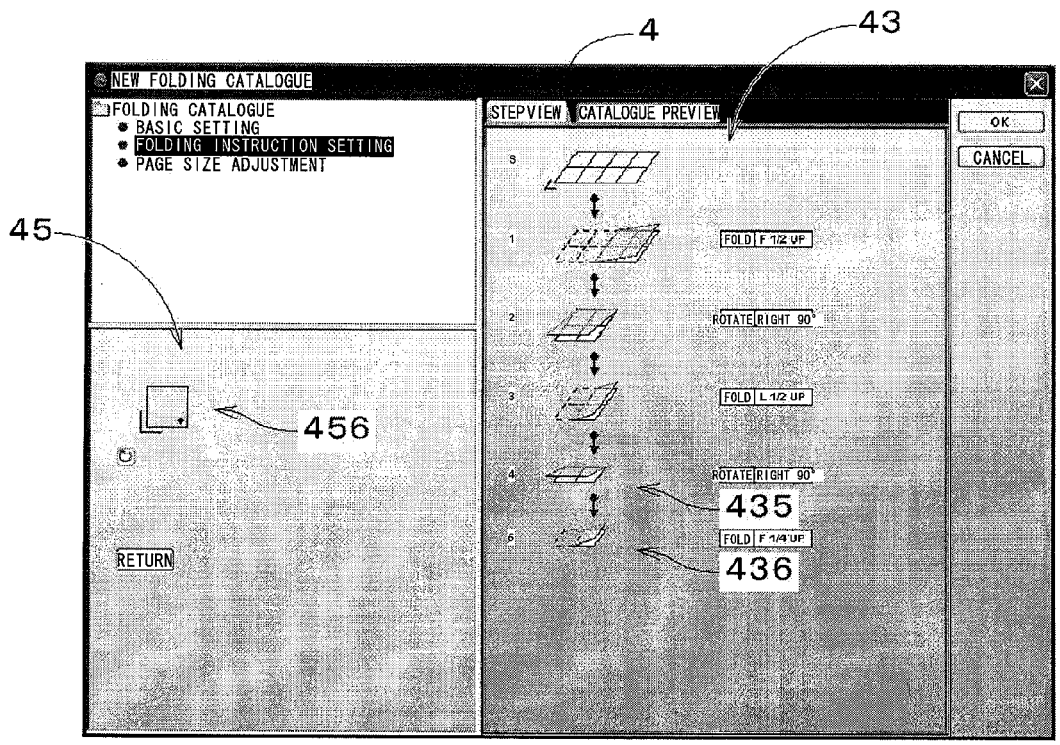

After input indicating that the print sheet is rotated in a clockwise direction by 90 degrees around an axis perpendicular to the main surface is performed by the operator, as shown in the instruction displaying part 43 of FIG. 10, an image 435 showing the print sheet in the state where the print sheet shown in the image 434 is rotated clockwise by 90 degrees is displayed (Steps S16, S15). In an image 455 on the instruction setting part 45 of FIG. 10, only one vertical dividing line 455a which equally divides the print sheet into 2 columns is shown, and the vertical dividing line 455a is selected as a folding position and a valley fold is selected as a folding direction. Therefore, as shown in the instruction displaying part 43 of FIG. 11, an image 436 showing the print sheet in the state where the print sheet shown in the image 435 is valley folded at the vertical dividing line 455a is displayed (Steps S16, S15).

As above, input of a folding position and a folding direction or input of rotation is iterated. When the print sheet shown in an image 456 on the instruction setting part 45 becomes a size corresponding to one rectangle obtained by dividing the original print sheet by the three vertical dividing lines 451a and the one horizontal dividing line 451b in the image 451 of FIG. 6, iteration of process of Step S15 is finished (Step S16). The above iteration of process of Step S15 is information indicating, in the order of folding events, folding positions (folding positions on a print sheet of indefinite size) and folding directions on a print sheet, that is a teaching process of information indicating an instruction to fold a print sheet, and the information is stored as the folding template information 31 (i.e., one set of folding template information 31) in the memory 24 to finish the process of generating the folding template information (Step S17). In fact, it is possible to return to any process of Steps S12, S18 to S20 in FIG. 4 or any process of Step S15 which is iterated, to modify the instruction to fold a print sheet (i.e., the folding template information 31).

Figure 12:
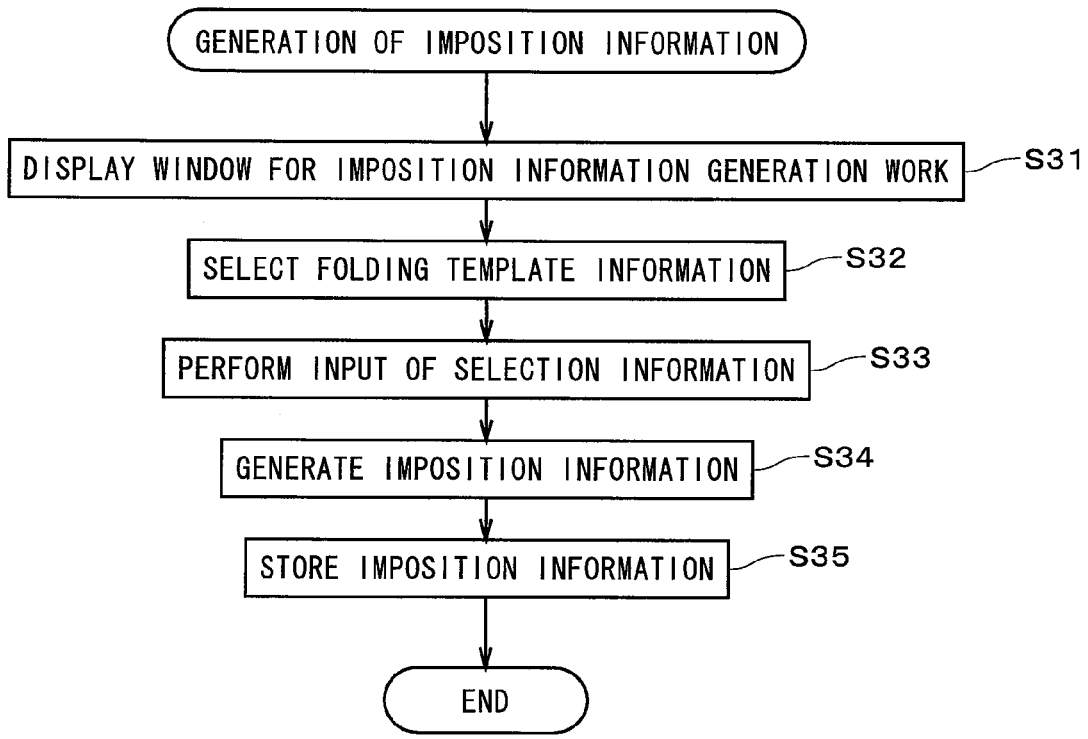
FIG. 12 is a flowchart showing an operation flow for generating imposition information.

FIG. 12 is a flowchart showing an operation flow for generating the imposition information 32. In generation of the imposition information 32, input indicating generation of the imposition information 32 is performed through the input part 107 by the operator, to display a window for imposition information generation work on the display 106 (Step S31). Subsequently, predetermined input is performed by the operator to select a set of folding template information 31 (Step S32). In this example, by iterating processes in FIG. 4, a plurality of sets of folding template information 31 indicating various instructions to fold a print sheet have been generated and stored in the memory 24 (only one set of folding template information 31 is shown in FIG. 3), and the set of folding template information 31 which indicates a folding instruction (i.e., an instruction to fold a print sheet) desired by the operator is specified by the input, to be outputted to the imposition information generator 22.

After the (set of) folding template information 31 is selected, input of a page size and the number of pages of a book product, a selection of orientation of bag-like portions in a section, a selection which side of the section is to be stitched, and a selection of stitching method in a stitching process are performed by the operator, to be received as selection information by the input receiving part 25 (Step S33). In the preferred embodiment, the page size of book product includes vertical and horizontal lengths of the rectangular page and an orientation of a longitudinal direction. The selection of orientation of bag-like portions in the section is to specify whether the bag-like portions in the section are to be located on the top or bottom of the section. In the section (i.e., folded print sheet) shown in the image 456 of FIG. 11, the bag-like portions is located on the top of the section (also see the images 435, 436). The selection which side of the section is to be stitched is to specify any one of the right side, the left side and the upper side. The selection of stitching method in the stitching process (it can be treated as a collating method in a collating process) is to specify perfect binding or saddle stitching.

In the imposition information generator 22, generated is the imposition information 32 (it is also called an imposition layout) indicating positions of areas on print sheets corresponding to respective pages of the book product and orientations of the respective pages on the print sheets, in accordance with an combination of the folding instruction, the page size, the number of pages, the orientation of bag-like portions in the section, the side to be stitched in the section, and the stitching method in the stitching process which are included in the folding template information 31 and the selection information (Step S34).

Figure 13:
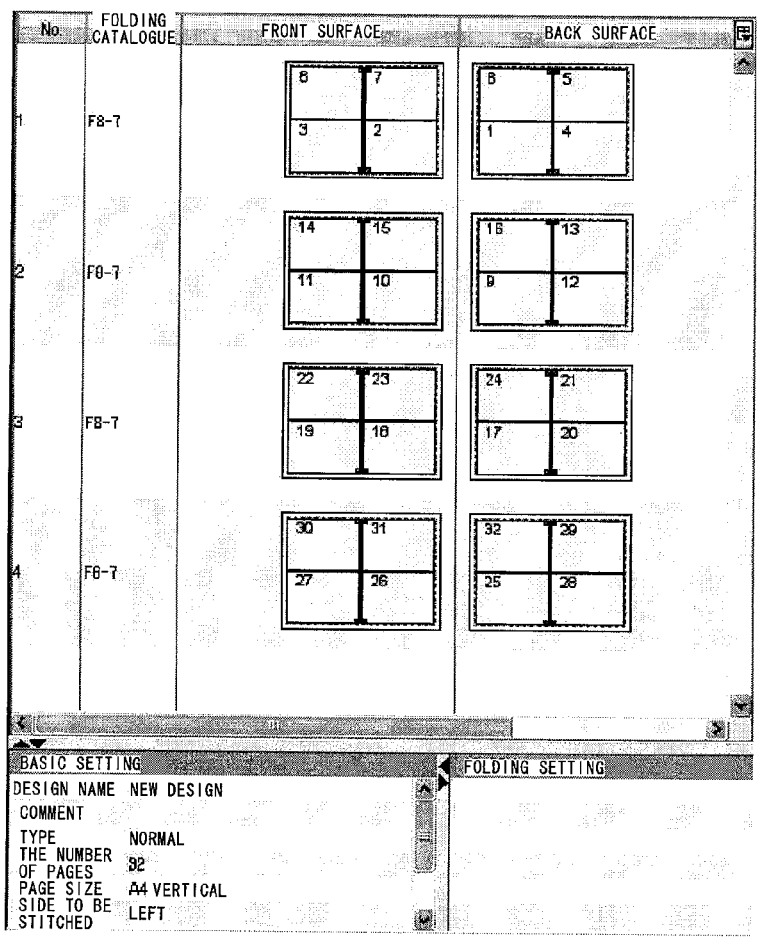
FIGS. 13 and 14 are views each showing content of the imposition information.

FIG. 13 is a view showing the positions of areas on the print sheets corresponding to respective pages of the book product and the orientations of the respective pages on the print sheets (i.e., content of the imposition information 32). The array on the left side of FIG. 13 shows page allocation on front surfaces of print sheets and the array on the right side shows page allocation on back surfaces of the print sheets. FIG. 13 shows page allocation on front and back surfaces of the first to fourth print sheets from the top downward. The imposition information 32 of FIG. 13 is based on predetermined folding template information 31 where the number of print sheets is 1 and the numbers of columns and rows are 2 columns and 2 rows when the folding process is performed, and also the page size is A4 vertical, the number of pages is 32, the orientation of bag-like portions in the section is the top, the side of the section to be stitched is the left side and the stitching method in the stitching process is the perfect binding. Actually, margins between page areas on the print sheet (they relate to a trimming width in the trimming machine 16), outer margins in the case where printing is performed with use of a printing plate in the printing machine 12 and so on, are set in advance (or they are set together with the selection information), the imposition information 32 becomes information including a size of print sheets and indicates coordinates of ranges of areas on the print sheets corresponding to respective pages of the book product.

Figure 14:
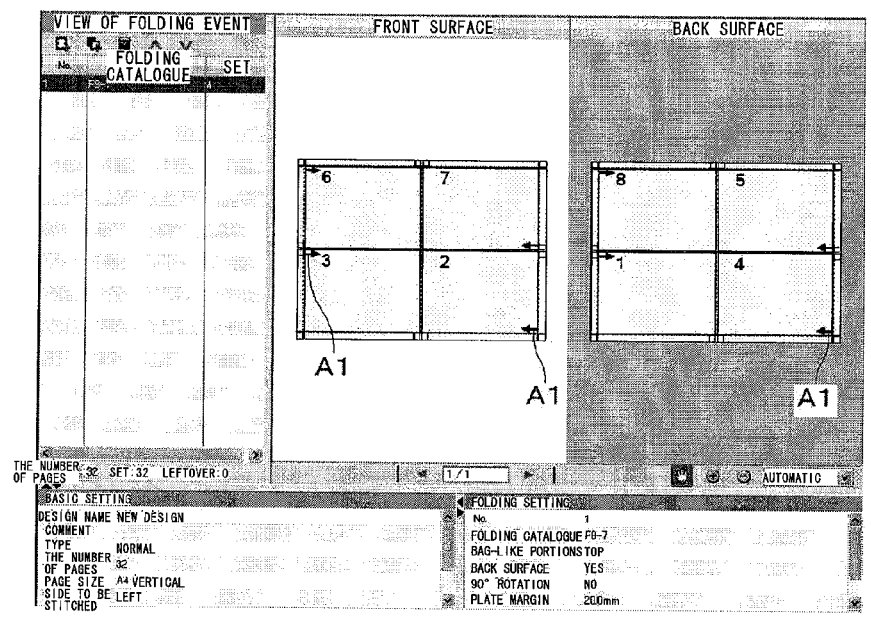
Figure 16A:
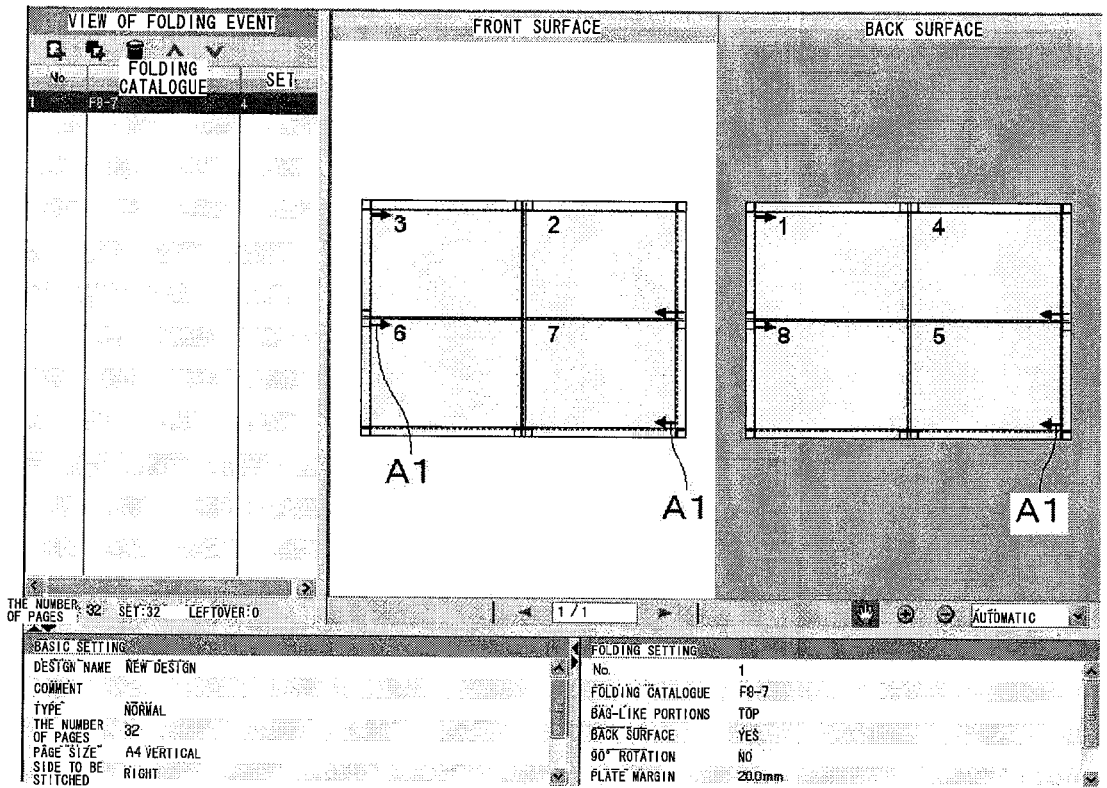
FIGS. 16A, 16B and 17 are views each showing content of the imposition information.
Figure 16B:
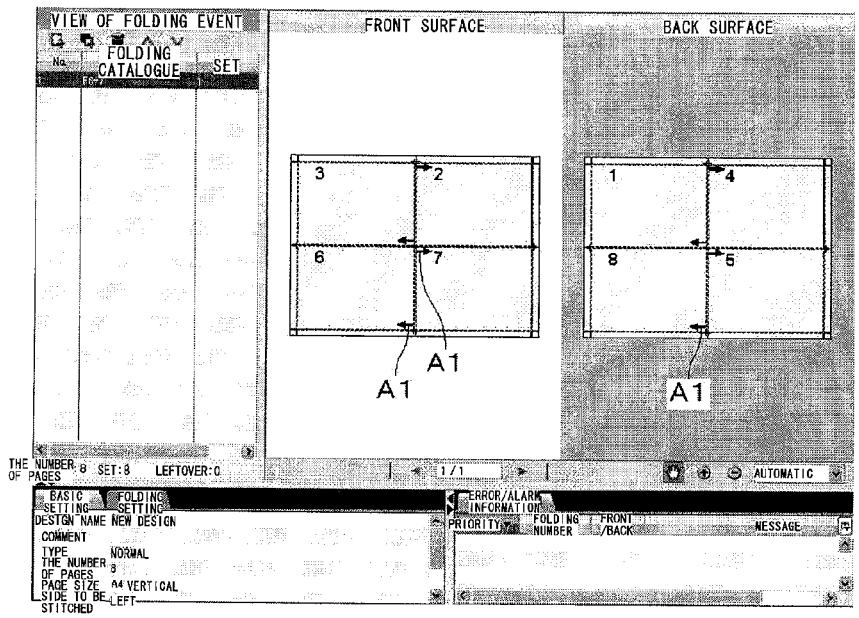

As indicated by arrows denoted by a reference sign A1 in FIG. 14 which shows page allocation on the both surface of one print sheet, the orientations of respective pages on the print sheets are also included in the imposition information 32 (the same applies to after-mentioned FIGS. 16A and 16B). The imposition information 32 generated in the imposition information generator 22 is stored in the memory 24 with a file name designated by the operator and furthermore it is outputted to the server 11 in FIG. 1 to be stored in a memory in the server 11 (Step S35).

In book manufacturing, a print sheet number corresponding to each page of the book product, and a position and an orientation of the page on the print sheet are specified on the basis of the imposition information 32. And image data of each page of the book product is printed at the position on the specified print sheet in the orientation by the printing machine 12. In fact, since a printing plate corresponding to each surface of printing sheet which the imposition information 32 indicates is made and printing is performed on the print sheet with use of the printing plate in actual printing machine 12, it can be regarded that a plate making system is constructed by the imposition information generating apparatus 2 and the printing machine 12. In the printing machine 12, plateless printing (for example, inkjet printing) where no printing plate is used may be performed.

Figure 15:
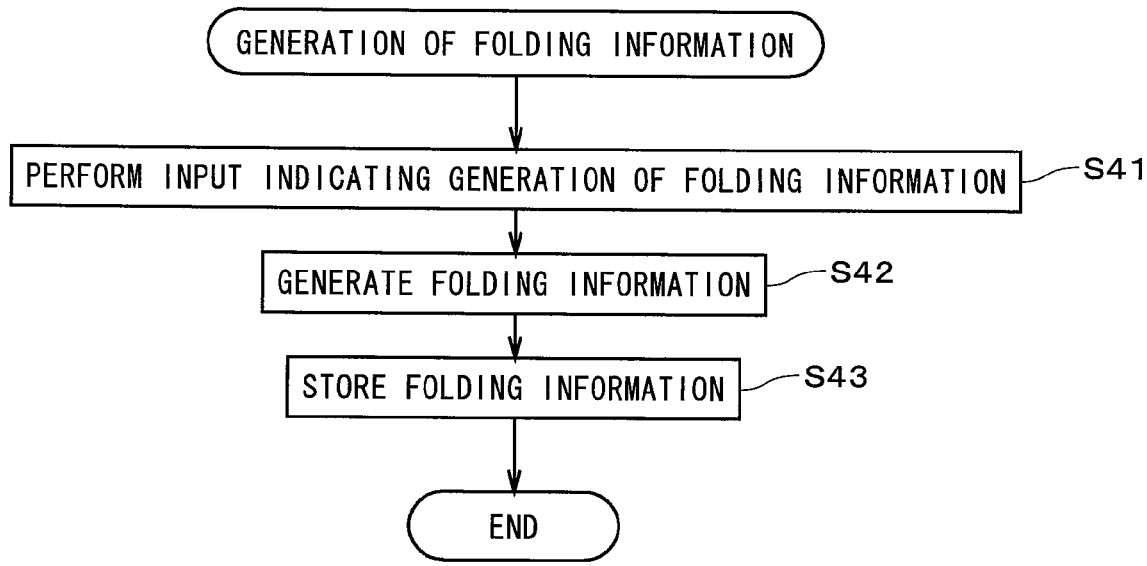
FIG. 15 is a flowchart showing an operation flow for generating folding information.

Next, an operation flow for generating folding information will be discussed with reference to FIG. 15. Here, the folding information is information utilized at the time when the folding process is performed by the folding machine 13 on print sheets after printing, and in the operation of FIG. 15, information utilized in the trimming process by the trimming machine 16 is also generated as described later.

In generation of the folding information, input indicating generation of the folding information is performed through the input part 107 by the operator, and the input is received by the input receiving part 25 (Step S41). In the folding information generator 23 of FIG. 3, the folding information indicating, in the order of folding events, folding position coordinates and folding directions on the print sheet (the print sheet after printing) which is an object in the folding process is generated on the basis of the folding template information 31 and the selection information (Step S42). At this time, since only folding positions on a print sheet of indefinite size are specified in the folding template information 31 together with their folding directions, coordinates of folding positions on a print sheet on which the folding process is actually performed are specified in the folding information together with their folding directions, on the basis of the page size and so on included in the selection information. For example, the coordinates is absolute coordinates based on the lower left vertex of the rectangular print sheet (the same applies to a print sheet in the state where its size becomes smaller than an original size with progress of the folding process). In the preferred embodiment, the folding information indicates, in the order of events, folding position coordinates and folding directions on the print sheet, and rotation.

Furthermore, in the folding information generator 23, information of coordinates of positions to be trimmed (hereinafter, the information is referred to as "trimming information") in the section after the folding process (in fact, that is a plurality of sections which are stacked and stitched) is generated on the basis of the folding template information 31 and the selection information. The folding information and the trimming information are outputted to the server 11 to be stored in the memory of the server 11 (and the memory 24 of the imposition information generating apparatus 2) with a file name designated by the operator (Step S43).

In book manufacturing, the folding process is performed on each print sheet after printing in the folding machine 13 on the basis of the folding information to make a section, and a plurality of sections are stacked in a predetermined order by the collating machine 14. After the plurality of sections are stitched by the stitching machine 15, three-side trimming is performed by the trimming machine 16 on the basis of the trimming information to complete a book product. In setting of each process in the folding machine 13 and the trimming machine 16, apparatus-specific correction values and the like, are reflected in addition to the folding information or the trimming information, as necessary. The folding information and the trimming information can be treated as preset information for the apparatuses.

Figure 17:
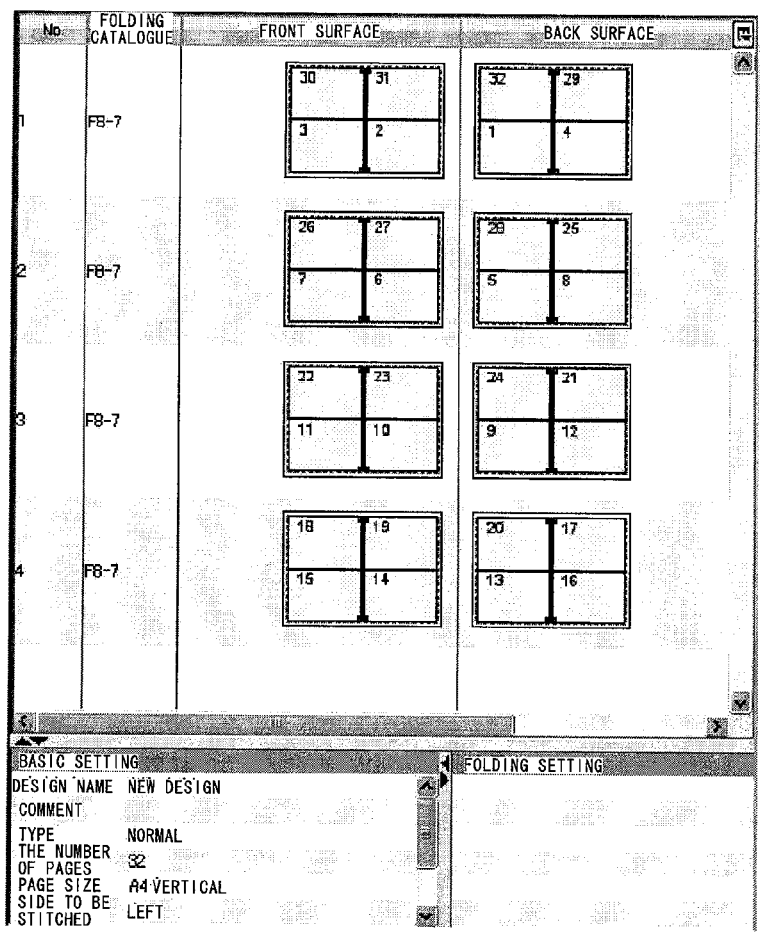

In the imposition information generating apparatus 2, after generation of the imposition information 32 of FIG. 13, even if the stitching machine 15 is replaced with another machine and the side of the section to be stitched is changed from the left side to the right side, the imposition information 32 showing page allocation is easily obtained (or changed) as shown in FIG. 16A by returning to Step S33 of FIG. 12 to change the side to be stitched in the selection information to the right side. The folding information and the trimming information can be generated again by the operation of FIG. 15, as necessary. Furthermore, even if the side of the section to be stitched remains the left side and the orientation of bag-like portions in the section is changed to the bottom, the imposition information 32 is obtained as shown in FIG. 16B by returning to Step S33 only to modify the orientation of bag-like portions. Still furthermore, after the imposition information 32 of FIG. 13 is generated, even if the stitching machine 15 (or the collating machine 14) is replaced with another machine and the stitching method in the stitching process is changed from the perfect binding to the saddle stitching, the imposition information 32 showing page allocation is obtained as shown in FIG. 17 by returning to Step S33 of FIG. 12 to change the stitching method included in the selection information to the saddle stitching. As above, in the imposition information generating apparatus 2, the imposition information 32 can be generated with making one set of folding template information 31 responsive to other various conditions.

Here, in a comparative example where a plurality of sets of imposition information (it is also called folding catalogues) corresponding to a plurality of combinations of a page size of book product, an instruction to fold a print sheet, an orientation of bag-like portions in a section, a side of the section to be stitched and so on, are prepared in advance and one set of imposition information corresponding to an actual book manufacturing process is selected from these sets of imposition information, since the number of these combinations becomes large, generation and management of many sets of imposition information are complicated and there is a possibility that a wrong selection is made when one set of imposition information corresponding to an actual book manufacturing process is selected from many sets of imposition information. In another comparative example where only suitable imposition information is generated when needed, if a condition such as the side of the section to be stitched or the stitching method in the stitching process is changed, imposition information need be regenerated from the start.

Correspondingly, in the imposition information generating apparatus 2, the folding template information 31 indicating the instruction to fold the print sheet is prepared in advance. When generating the imposition information 32, input of the selection information including the page size and the number of pages of the book product, the selection whether bag-like portions in the section are to be located on the top or bottom of the section, the selection which side of the section is to be stitched, and the selection of stitching method in the stitching process, is received. Then, the imposition information 32 for printing the print sheet which is to be folded into the section is generated on the basis of the folding template information 31 and the selection information. As above, the setting phase of complicated folding template information 31 is made different from the setting phase of selection information indicating the other conditions by preparing the folding template information 31 in advance, and therefore the number of conditions included in the selection information (i.e., the number of items to be selected) can become small to generate the imposition information 32 easily. Also in the present technique, preliminary generation and management of many sets of imposition information need not be done, and a wrong selection of imposition information like the above comparative example can not be made. Furthermore, in the case where various conditions other than the folding instruction, such as the side of the section to be stitched or the stitching method in the stitching process, are changed, the imposition information 32 can be obtained (regenerated) easily only by changing the selection information without change of the folding template information 31 and it is possible to deal with the change of condition promptly.

In the generation process of the folding template information 31 on the basis of input by the operator indicating the folding instruction, the folding instruction which folding template information in the course of generation indicates is displayed on the display 106 by the template generator 21 in parallel with the generation process. Therefore, the operator can generate the folding template information 31 easily by referring to the folding instruction displayed on the display 106. Furthermore, since the folding information indicating, in the order of events, the folding position coordinates and the folding directions on the print sheet after printing is generated on the basis of the folding template information 31 and the selection information, setting of the external folding machine 13 for the folding process can be performed easily in a short amount of time.

Figure 18:
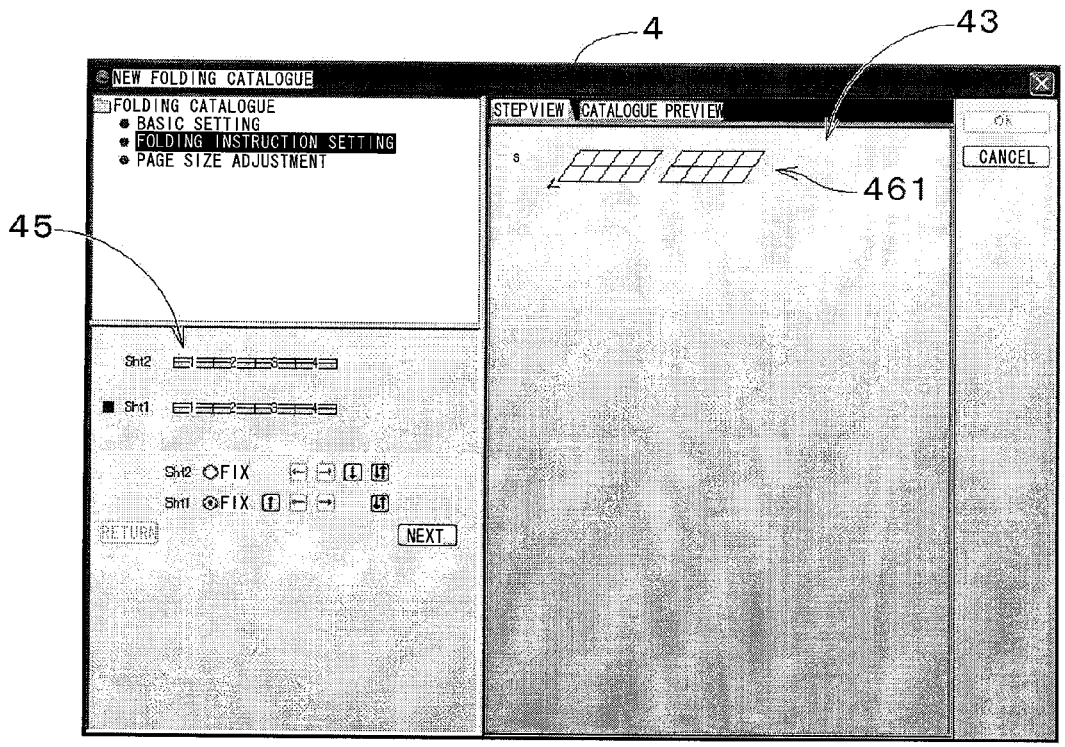
FIGS. 18 to 24 are views each showing a window displayed in generation of the folding template information.

Next, discussion will be made on a process of generating the folding template information 31 in the case where a plurality of print sheets are the object in the folding process. For example, in the case where overlaid two print sheets is the object in the folding process, input indicating "2" is performed in the setting part 41 (see FIG. 5) of the number of sheets in Step S12 of FIG. 4. Therefore, as shown in FIG. 18, an image 461 showing two print sheets is displayed on the instruction displaying part 43. In an example of FIG. 18, input indicating "4 columns and 2 rows" is performed to the setting part 42 of the numbers of columns and rows, in the image 461, dividing lines which equally divide each print sheet into 4 columns and 2 rows are shown.

Figure 19:
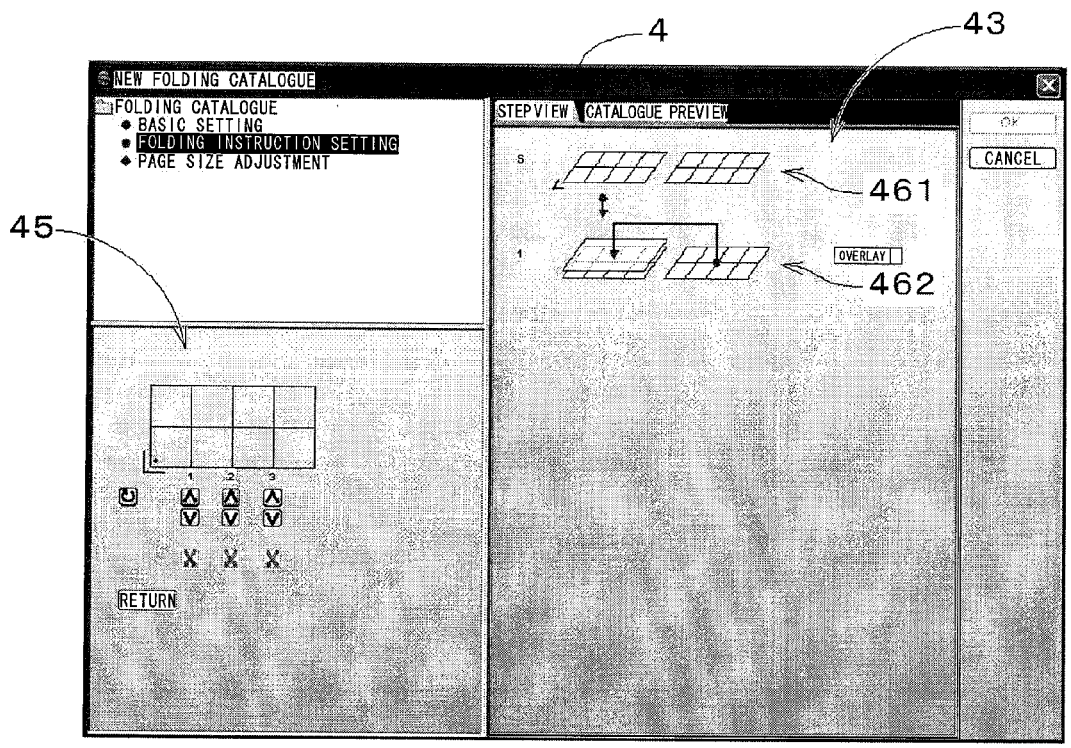
Figure 20:
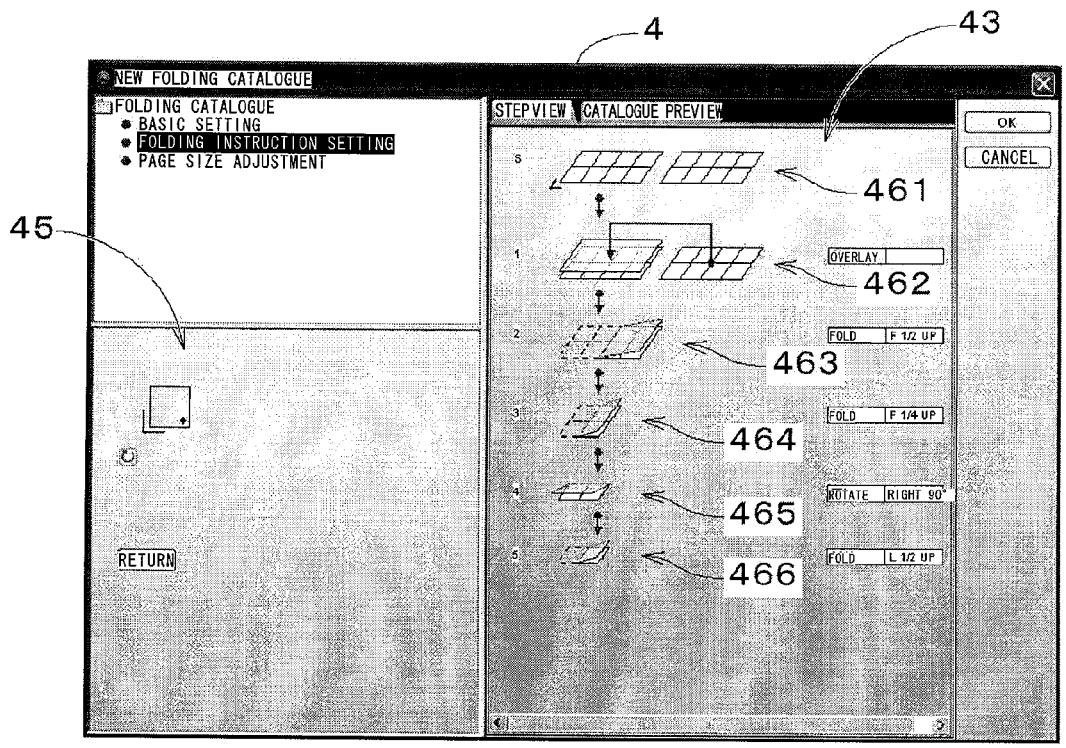

Subsequently, in the instruction setting part 45, input indicating a manner of overlaying of the plurality of print sheets is performed (Steps S13, S18). In this example, input indicating that two print sheets are completely overlaid each other (in other words, two print sheets are stacked so that a dividing line of one print sheet and the corresponding dividing line of the other print sheet meet) is performed, and as shown in FIG. 19, an image 462 showing two print sheets which are completely overlaid is displayed on the instruction displaying part 43. After that, input of a folding position and a folding direction or input of rotation is iterated in a similar fashion to the above example (Steps S15, S16), and as shown in images 461 to 466 on the instruction displaying part 43 of FIG. 20, the folding template information 31 indicating the manner of overlaying of the plurality of print sheets and the folding instruction of the overlaid print sheets is generated and stored in the memory 24 (Step S17).

The plurality of print sheets need not be completely overlaid, and they may be overlaid in the state where they are offset from each other as needed. The print sheets more than two may be the object in the folding process.

Next, discussion will be made on a process of generating the folding template information 31 in the case where cutting is performed on the print sheet between the printing and folding processes. For example, in the case where, in Step S12 of FIG. 4, "1" is inputted to the setting part 41 of the number of sheets and "6 columns and 2 rows" is inputted to the setting part 42 of the numbers of columns and rows, when cutting of the print sheet is performed between the printing and folding processes (after the printing process before the folding process) (Steps S13, S14), input of a cutting position on the print sheet is performed by the operator (Step S19).

Figure 21:
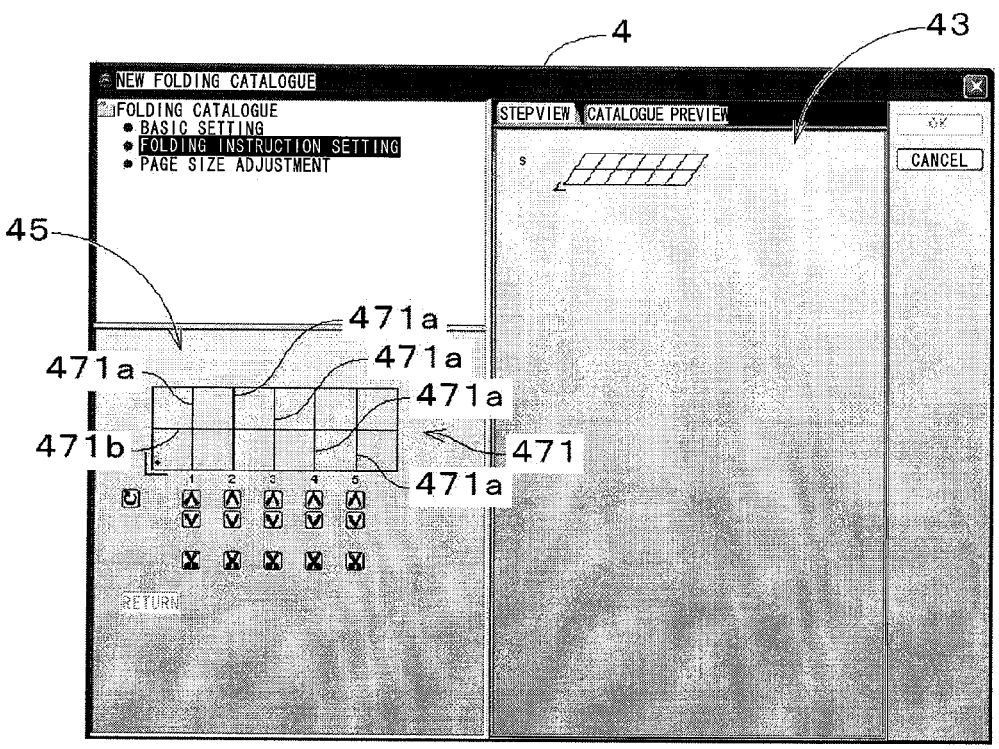
Figure 22:
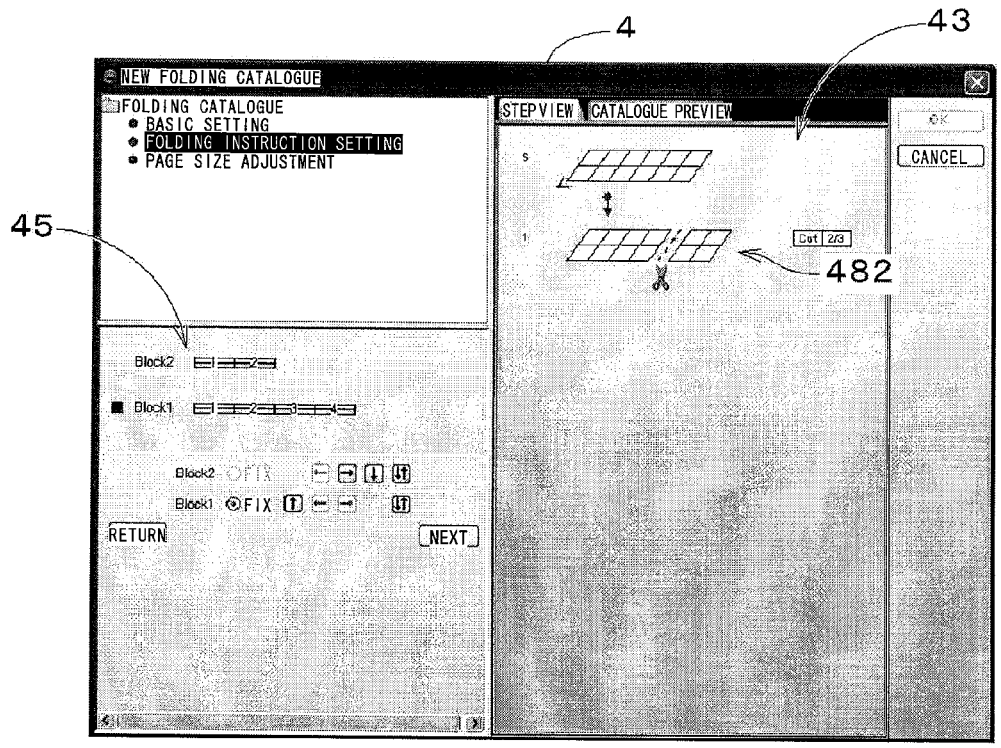

Specifically, in an image 471 showing the print sheet on the instruction setting part 45 of FIG. 21, five vertical dividing lines 471a which equally divide the print sheet into 6 columns and one horizontal dividing line 471b which equally divides the print sheet into 2 rows are shown. When the operator enters input which indicates the second vertical dividing line 471a from the right side is a cutting position, as shown in the instruction displaying part 43 of FIG. 22, an image 482 showing two sheets obtained by dividing the print sheet into two at the vertical dividing line 471a is displayed.

Figure 23:
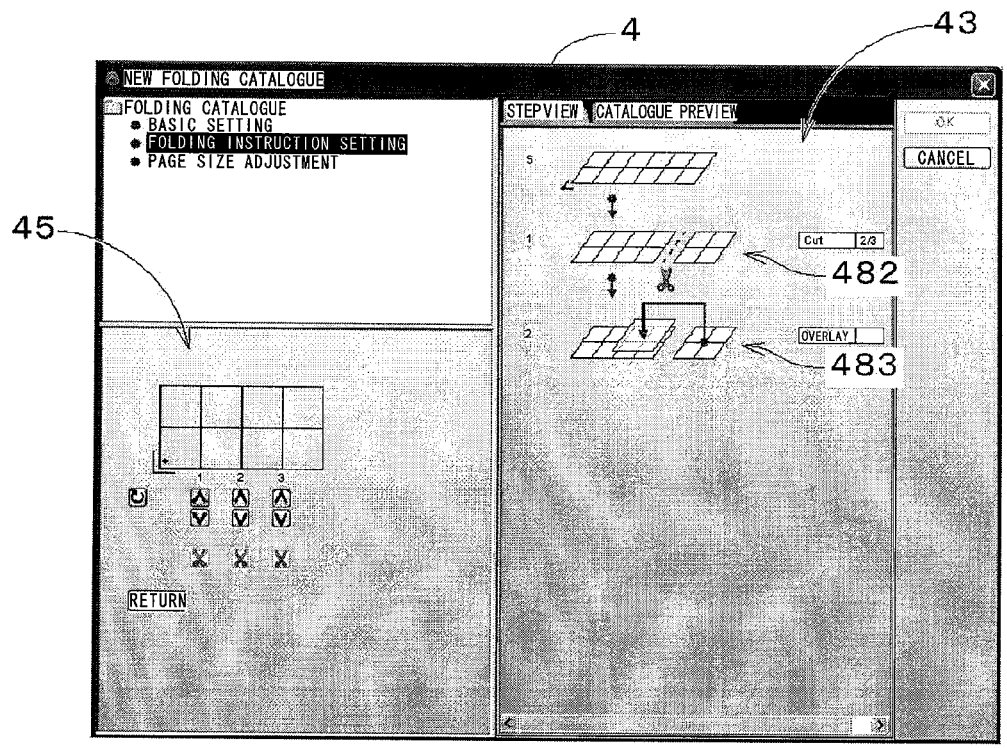
Figure 24:
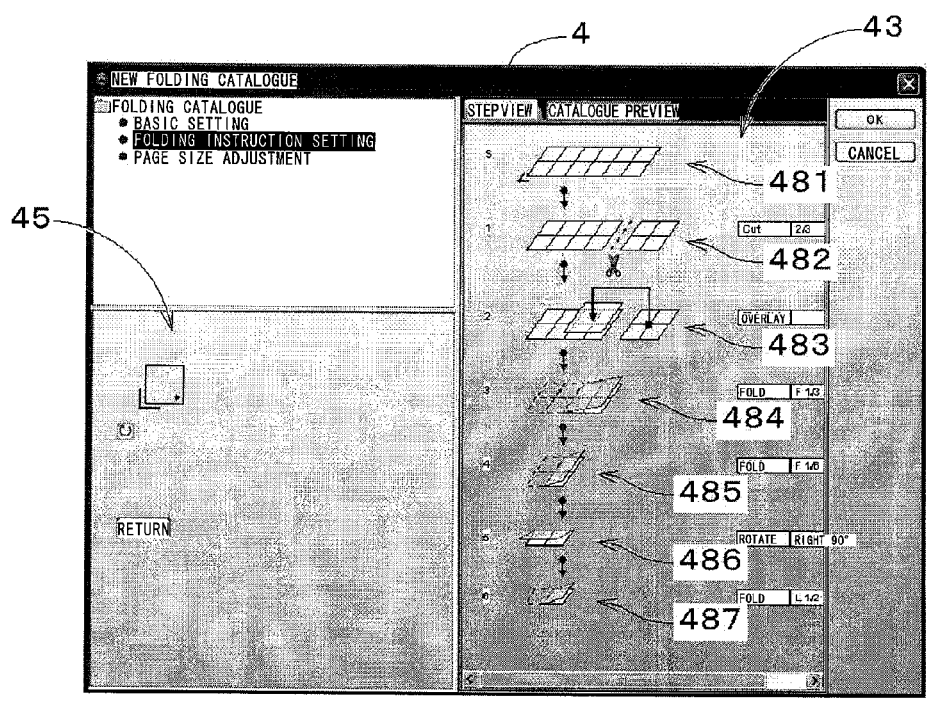

Subsequently, in the instruction setting part 45, input indicating a manner of overlaying of the two sheets after cutting is performed (Step S20). In this example, input indicating that a smaller sheet of the two sheets (the right sheet in image 482) is completely overlaid on the right half of the other sheet (in other words, two sheets are overlapped so that two right edges of the two sheets meet) is entered, and as shown in FIG. 23, an image 483 showing overlaid two sheets is displayed on the instruction displaying part 43. After that, input of a folding position and a folding direction or input of rotation is iterated in a similar fashion to the above example (Steps S15, S16), and as shown in images 481 to 487 on the instruction displaying part 43 of FIG. 24, the folding template information 31 indicating the cutting position on the print sheet, the manner of overlaying of the plurality of sheets after cutting and the folding instruction of the overlaid sheets is generated and stored in the memory 24 (Step S17). In the above operation, cutting may be performed more than one time.

As above, in the imposition information generating apparatus 2, the folding template information 31 including the cutting position on the print sheet between the printing and folding processes and the overlaying position of the plurality of sheets after cutting, or the number of print sheets to be overlaid and folded as a unit after the printing process can be generated, the imposition information 32 is generated on the basis of the folding template information 31 and the selection information which is inputted separately. It is therefore possible to easily generate the imposition information 32 in the imposition information generating apparatus 2 in the case where the folding process is performed on the sheets overlaid as the unit. In the case where Step S18 or Steps S19, S20 are performed, the cutting position or/and the overlaying position is included in the folding information, and the object in the actual folding process by the folding machine 13 becomes the overlaid sheets.

Though the preferred embodiments of the present invention have been discussed above, the present invention is not limited to the above-discussed preferred embodiments, but allows various variations.

In the above preferred embodiments, since the selection information includes the selection of perfect binding or saddle stitching, the imposition information can be generated easily in consideration of difference between perfect binding and saddle stitching. However, in the case where the stitching method in the stitching process is decided as any one of perfect binding and saddle stitching in advance, the selection of the stitching method may be excluded from the selection information. When the stitching method is decided as the perfect binding, same allocation order is repeated for a plurality of print sheets. Thus, there may be a case where the number of pages is excluded from the selection information and allocation of image data of pages for the plurality of print sheets is performed in conformity to the number of pages of actual book product in the printing process by the printing machine 12. As above, the selection information may include at least the page size of the book product, the selection whether bag-like portions in the section are to be located on the top or bottom of the section, and the selection which side of the section is to be stitched.

In addition, binding (bookbinding) with staples or binding with adhesive may be performed in the book manufacturing system 1. Thus, the selection information includes at least the page size of the book product, the selection whether bag-like portions in the section are to be located on the top or bottom of the section, and the selection which side of the section is to be bound. Preferably, the selection information further includes the selection of perfect binding or saddle binding. Printing for the print sheet may be one side printing, and a selection of both sides printing or one side printing may be added to the selection information.

There may be a case where after the folding template information 31 is generated by an external apparatus, the folding template information 31 is inputted to the imposition information generating apparatus 2 to be stored and prepared in the memory 24.

In the operation of FIG. 12, the selection information is inputted after the folding template information 31 is selected. However, the folding template information 31 may be selected after the selection information is inputted. As above, the order of steps in each operation of FIG. 4, FIG. 12 and FIG. 15 may be changed to the extent possible.

The constituent elements of above-discussed preferred embodiments and respective modified examples may be appropriately combined with one another, as long as they are not mutually exclusive.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2009-221558 filed in the Japan Patent Office on Sep. 25, 2009, the entire disclosure of which is incorporated herein by reference.

REFERENCE SIGNS LIST 2 imposition information generating apparatus
10 computer
21 template generator
22 imposition information generator
23 folding information generator
24 memory
25 input receiving part
31 folding template information
32 imposition information
91 recording medium
92 program
106 display
S12 to S20, S33, S34, S42 step

The invention claimed is:

1. An apparatus for generating imposition information for printing a print sheet which is to be folded into a section after printing, comprising:
   a memory which stores a template generator for generating a set of folding template information indicating folding positions on a print sheet and folding directions with an image as a folding instruction to fold a print sheet, said set of folding template information not indicating positions of areas on said print sheet corresponding to respective pages of a book product and orientations of said respective pages on said print sheet;
   a display for displaying said folding instruction which said set of folding template information in the course of generation indicates;
   a memory which stores said set of folding tem late information generated by said template generator;
   an input receiving part for receiving input of selection information including a page size of a book product, a selection whether bag-like portions in a section are to be located on the top or bottom of said section, and a selection which side of said section is to be bound;
   an imposition information generator that generates imposition information indicating a size of a print sheet to be printed, positions of areas on said print sheet corresponding to respective pages of said book product and orientations of said respective pages on said print sheet; and
   means for selecting one set of folding template information from said memory with predetermined input, so that said set of folding template information is outputted to said imposition information generator; wherein
   said imposition information generator generates said imposition information on the basis of said set of folding template information and said selection information, and regenerates said imposition information without change or modification of said set of folding template information when said selection information is changed.

2. The apparatus according to claim 1, wherein
   said selection information includes a selection of perfect binding or saddle binding.

3. The apparatus according to claim 1, wherein
   said set of folding template information includes a cutting position on a print sheet between printing and folding processes and an overlaying position of a plurality of sheets after cutting, or the number of print sheets to be overlaid and folded as a unit after a printing process.

4. The apparatus according to claim 2, wherein
   said set of folding template information includes a cutting position on a print sheet between printing and folding processes and an overlaying position of a plurality of sheets after cutting, or the number of print sheets to be overlaid and folded as a unit after a printing process.

5. The apparatus according to claim 1, wherein
   said template generator generates said set of folding template information on the basis of input by an operator indicating a folding position on said print sheet shown in said image and a folding direction or rotation of said print sheet shown in said image for said folding instruction, and said display displays said folding position and said folding direction or said rotation for said folding instruction which said set of folding template information in the course of generation indicates.

6. The apparatus according to claim 2, wherein said template generator generates said set of folding template information on the basis of input by an operator indicating a folding position on said print sheet shown in said image and a folding direction or rotation of said print sheet shown in said image for said folding instruction, and said display displays said folding position and said folding direction or said rotation for said folding instruction which said set of folding template information in the course of generation indicates.

7. The apparatus according to claim 1, further comprising:

a folding information generator for generating folding information indicating, in the order of folding events, folding position coordinates and folding directions on an object in a folding process on the basis of said set of folding template information and said selection information.

8. The apparatus according to claim 2, further comprising:

a folding information generator for generating folding information indicating, in the order of folding events, folding position coordinates and folding directions on an object in a folding process on the basis of said set of folding template information and said selection information.

9. A computer-readable recording medium which is non-transitory, carrying a program for causing a computer to generate imposition information for printing a print sheet which is to be folded into a section after printing, wherein execution of said program by said computer causes said computer to perform the steps of:

a) generating a set of folding template information indicating folding positions on a print sheet and folding directions with an image as a folding instruction to fold a print sheet, said set of folding template information not indicating positions of areas on said print sheet corresponding to respective pages of a book product and orientations of said respective pages on said print sheet;

b) displaying said folding instruction which said set of folding template information in the course of generation indicates, on a display;

c) storing said set of folding template information generated in said step a), in a memory in said computer;

d) receiving input of selection information including a page size of a book product, a selection whether bag-like portions in a section are to be located on the top or bottom of said section, and a selection which side of said section is to be bound;

e) selecting one set of folding template information from said memory with predetermined input; and f) generating imposition information indicating a size of a print sheet to be printed, positions of areas on said print sheet corresponding to respective pages of said book product and orientations of said respective pages on said print sheet on the basis of said selection information and said set of folding template information selected in said step e), wherein said imposition information is regenerated without change or modification of said set of folding template information when said selection information is changed.

10. The recording medium according to claim 9, wherein said selection information includes a selection of perfect binding or saddle binding.

11. The recording medium according to claim 9, wherein said set of folding template information includes a cutting position on a print sheet between printing and folding processes and an overlaying position of a plurality of sheets after cutting, or the number of print sheets to be overlaid and folded as a unit after a printing process.

12. The recording medium according to claim 10, wherein said set of folding template information includes a cutting position on a print sheet between printing and folding processes and an overlaying position of a plurality of sheets after cutting, or the number of print sheets to be overlaid and folded as a unit after a printing process.

13. The recording medium according to claim 9, wherein in said step a), said set of folding template information is generated on the basis of input by an operator indicating a folding position on said print sheet shown in said image and a folding direction or rotation of said print sheet shown in said image for said folding instruction, and in said step b), said folding position and said folding direction or said rotation for said folding instruction which said set of folding template information in the course of generation indicates, is displayed on said display.

14. The recording medium according to claim 10, wherein in said step a), said set of folding template information is generated on the basis of input by an operator indicating a folding position on said print sheet shown in said image and a folding direction or rotation of said print sheet shown in said image for said folding instruction, and in said step b), said folding position and said folding direction or said rotation for said folding instruction which said set of folding template information in the course of generation indicates, is displayed on said display.

15. The recording medium according to claim 9, wherein execution of said program by said computer causes said computer to further perform the step of g) generating folding information indicating, in the order of folding events, folding position coordinates and folding directions on an object in a folding process on the basis of said set of folding template information and said selection information.

16. The recording medium according to claim 10, wherein execution of said program by said computer causes said computer to further perform the step of g) generating folding information indicating, in the order of folding events, folding position coordinates and folding directions on an object in a folding process on the basis of said set of folding template information and said selection information.

17. An apparatus for generating imposition information for printing a print sheet which is to be folded into a section after printing, comprising:

a template generator for generating a set of folding template information indicating folding positions on a print sheet and folding directions with an image as a folding instruction to fold a print sheet, said set of folding template information not indicating positions of areas on said print sheet corresponding to respective pages of a book product and orientations of said respective pages on said print sheet;

a memory which stores said set of folding template information generated by said template generator;

an input receiving part for receiving input of selection information including a page size of a book product, a selection whether bag-like portions in a section are to be located on the top or bottom of said section, and a selection which side of said section is to be bound;

an imposition information generator that generates imposition information indicating a size of a print sheet to be printed, positions of areas on said print sheet corresponding to respective pages of said book product and orientations of said respective pages on said print sheet, on the basis of said set of folding template information and said selection information, and that regenerates said imposition information without change or modification of said set of folding template information when said selection information is changed; and a display for displaying said folding positions and said folding directions, and rotation in said folding instruction which said set of folding template information in said memory indicates.

18. A computer-readable recording medium which is non-transitory, carrying a program for causing a computer to generate imposition information for printing a print sheet which is to be folded into a section after printing, wherein execution of said program by said computer causes said computer to perform the steps of:

a) generating a set of folding template information indicating folding positions on a print sheet and folding directions with an image as a folding instruction to fold a print sheet, said set of folding template information not indicating positions of areas on said print sheet corresponding to respective pages of a book product and orientations of said respective pages on said print sheet;

b) storing said set of folding template information generated in said step a), in a memory in said computer;

c) displaying said folding positions and said folding directions, and rotation in said folding instruction which said set of folding template information in said memory indicates;

d) receiving input of selection information including a page size of a book product, a selection whether bag-like portions in a section are to be located on the top or bottom of said section, and a selection which side of said section is to be bound;

e) generating imposition information indicating a size of a print sheet to be printed, positions of areas on said print sheet corresponding to respective pages of said book product and orientations of said respective pages on said print sheet on the basis of said selection information and said set of folding template information, wherein said imposition information is regenerated without change or modification of said set of folding template information when said selection information is changed.

* * * * *

UNITED STATES PATENT AND TRADEMARK OFFICE
CERTIFICATE OF CORRECTION

PATENT NO. : 8,879,111 B2
APPLICATION NO. : 12/858160
DATED : November 4, 2014
INVENTOR(S) : Toshiyuki Yamasaki It is certified that error appears in the above-identified patent and that said Letters Patent is hereby corrected as shown below:

In the claims

Claim 1 at column 12, line 15, "a memory which stores" should be deleted.

Signed and Sealed this
Twelfth Day of May, 2015

Michelle K. Lee
*Director of the United States Patent and Trademark Office*